(12) United States Patent
Hong et al.

(10) Patent No.: US 6,473,082 B1
(45) Date of Patent: Oct. 29, 2002

(54) SYSTEM AND METHOD FOR IMPLEMENTING A TWO-LAYER Z-RANGE BUFFER

(75) Inventors: Mike Hong, San Jose; Lin Chen, Fremont, both of CA (US)

(73) Assignee: S3 Graphics Co., Ltd. (KN)

( * ) Notice: Subject to any disclaimer, the term of this patent is extended or adjusted under 35 U.S.C. 154(b) by 0 days.

(21) Appl. No.: 09/313,857

(22) Filed: May 18, 1999

(51) Int. Cl.[7] .............................................. G06F 15/00
(52) U.S. Cl. ..................................................... 345/422
(58) Field of Search ................................ 345/418–423

(56) References Cited

U.S. PATENT DOCUMENTS

| | | | |
|---|---|---|---|
| 4,855,938 A | 8/1989 | Gonzalez-Lopez et al. | 364/522 |
| 5,416,893 A | 5/1995 | Herrell et al. | 395/122 |
| 5,509,110 A | 4/1996 | Latham | 395/121 |
| 5,596,686 A | 1/1997 | Duluk, Jr. | 395/122 |
| 5,761,400 A | 6/1998 | Derby et al. | 395/122 |
| 5,825,363 A | 10/1998 | Anderson | 345/422 |
| 6,052,125 A * | 4/2000 | Gardiner et al. | 345/421 |

FOREIGN PATENT DOCUMENTS

| | | |
|---|---|---|
| EP | 0 489 594 A2 | 6/1992 |
| GB | 2 301 513 A | 12/1996 |

* cited by examiner

Primary Examiner—Almis R. Jankus
(74) Attorney, Agent, or Firm—Carr & Ferrell LLP

(57) ABSTRACT

A system and method for implementing a z-range buffer during the generation and display of three-dimensional graphical images. The display screen is partitioned into a plurality of display blocks. For each display block, the z-range buffer stores minimum and maximum depth values (z-values) of a front layer of the block and a back layer of the block. The z-range buffer further stores a bitmask value where each bit in the bitmask associates a pixel in the block to either the front layer or the back layer. When a new triangle is to be displayed, the minimum and/or maximum z-values of the pixels of the triangle are compared with the minimum and/or maximum z-values of the front layer and/or the back layer. By making such z-comparisons, it is often possible to make generalizations of the z-values of the remaining pixels in the triangle without individually analyzing their z-values.

34 Claims, 19 Drawing Sheets

SYSTEM AND METHOD FOR IMPLEMENTING A TWO-LAYER Z-RANGE BUFFER

BACKGROUND OF THE INVENTION

The present invention relates to computer graphics generation and display, and more particularly, to computer graphics generation display with reduced need for accessing a z-buffer during the generation and display of graphical images.

A computer graphics display system allows displays of graphical images on pixel-oriented output devices. FIG. 1 is a simplified, semi-schematic block diagram of one such exemplary system. As illustrated in FIG. 1, the system comprises a processor 10, a frame buffer 12, a display monitor 14, and a display controller 16. The display monitor 14 includes a screen which displays a plurality of pixels, a pixel being the smallest addressable element in an electronic display. The individual pixels on the screen are addressed using x and y coordinates, in the same manner as points on a graph are addressed.

The frame buffer 12 resides in main memory 18 and stores a pixel number map corresponding to a graphical image. The pixel number map can be represented by a grid-like array of pixels where each pixel is assigned a color and a shade value. Typically, those values are represented as R, G, B, and A values corresponding to the red color, green color, blue color, and the intensity values of the pixel making up the graphical image. The number of bits defining the R, G, B, and A values depend on the number of colors and shades to be represented.

The processor computes and updates the pixel values in the frame buffer 12 when a new graphical image 13 is to be displayed. During the display process, the display controller 16 acts as an interface between the frame buffer 12 and the display monitor 14 by taking the pixel values in the frame buffer and converting them to a video signal for display by the monitor.

In processing a three-dimensional graphical object, the depth attribute of the object must be considered prior to the updating of any pixel values in the frame buffer. If the new object being processed is located behind and is partially obscured by the displayed object, only a visible portion of the new object should be displayed. On the other hand, if the new object is completely obscured by the displayed object, no updates to the frame buffer is necessary and the new object is not displayed.

Three-dimensional objects are often represented by a set of vertices defining polygon surfaces. Each vertex is defined by x, y, and z dimensions corresponding to the X, Y, and Z axes. The X and Y axes define a view plane and the Z axis represents a distance from the view plane. A z coordinate value, therefore, indicates the depth of an object at a pixel location defined by specific x and y coordinates.

A z-buffer 20 storing the z-value of each pixel, and hence, the depth value of each pixel, permits performance of depth analysis of a three-dimensional object. This process is often referred to as a "hidden surface removal process." When a new object moves into a displayed portion of the view plane, a determination must be made as to whether the new object is visible and should be displayed, or whether the new object is hidden by objects already in the displayed portion of the view plane. The determination of whether the new object should be displayed is generally done on a pixel-by-pixel basis. Thus, for each pixel, defined by x-y coordinates, the depth, or z-value, of the new object is compared to the depth, or z-value, of the currently displayed object. If the comparison indicates that the new pixel to be drawn is in front of the old pixel in the z-buffer (i.e. the new z-value is less than the old z-value), the old z-value is replaced with the new z-value, and the R, G, B, and A values for the new pixel are written to the frame buffer for being displayed in the place of the old pixel. On the other hand, if the new pixel is located behind the old pixel, it will be hidden from view and need not be displayed. In this situation, the old z-value is kept in the z-buffer and the new z-value is discarded. The old pixel remains displayed and is not replaced by the new pixel.

There are several disadvantages to the above process. First, initializing each pixel in the z-buffer to a constant value (generally the value of the background) is expensive in terms of time and memory bandwidth. Furthermore, the pixel-by-pixel analysis during the display of an object requires a z-buffer read for each pixel to compare the z-value of the old pixel with respect to the new pixel. Because z-buffers are large and cannot be stored on-chip, thereby requiring external memory access, such z-comparisons significantly slow down the display process. In addition, significant computational cycles are expended in performing pixel-by-pixel comparisons. Accordingly, there is a need for a system and method for computer graphics generation and display that will perform hidden surface removal with less computation cycles and memory bandwidth waste.

SUMMARY OF THE INVENTION

The present invention specifically addresses and alleviates the above-mentioned deficiencies associated with the prior art. More particularly, the present invention comprises a computer graphics display system that eliminates the initialization of the z-buffer to a constant value. In addition, the system performs z-comparisons on groups of pixels thereby reducing the number of z-buffer accesses for performing pixel-by-pixel comparisons.

In accordance with one aspect of the invention, a screen is partitioned into a plurality of display blocks having one or more layers of pixels. A z-range buffer is generated for storing minimum and maximum depth values of the layers of a display block. The z-range buffer further stores a bitmask value where each bit in the bitmask associates a pixel in the block to a particular layer in the block. The system compares a depth value of a polygon with a depth value of a particular layer, and identifies visible pixels in the block making up the polygon based on the comparison.

In another aspect of the invention, the polygon over the block is a triangle.

In yet another aspect of the invention, each block has two layers corresponding to a front layer and a back layer, each layer having depth values ranging from a minimum depth value to a maximum depth value.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
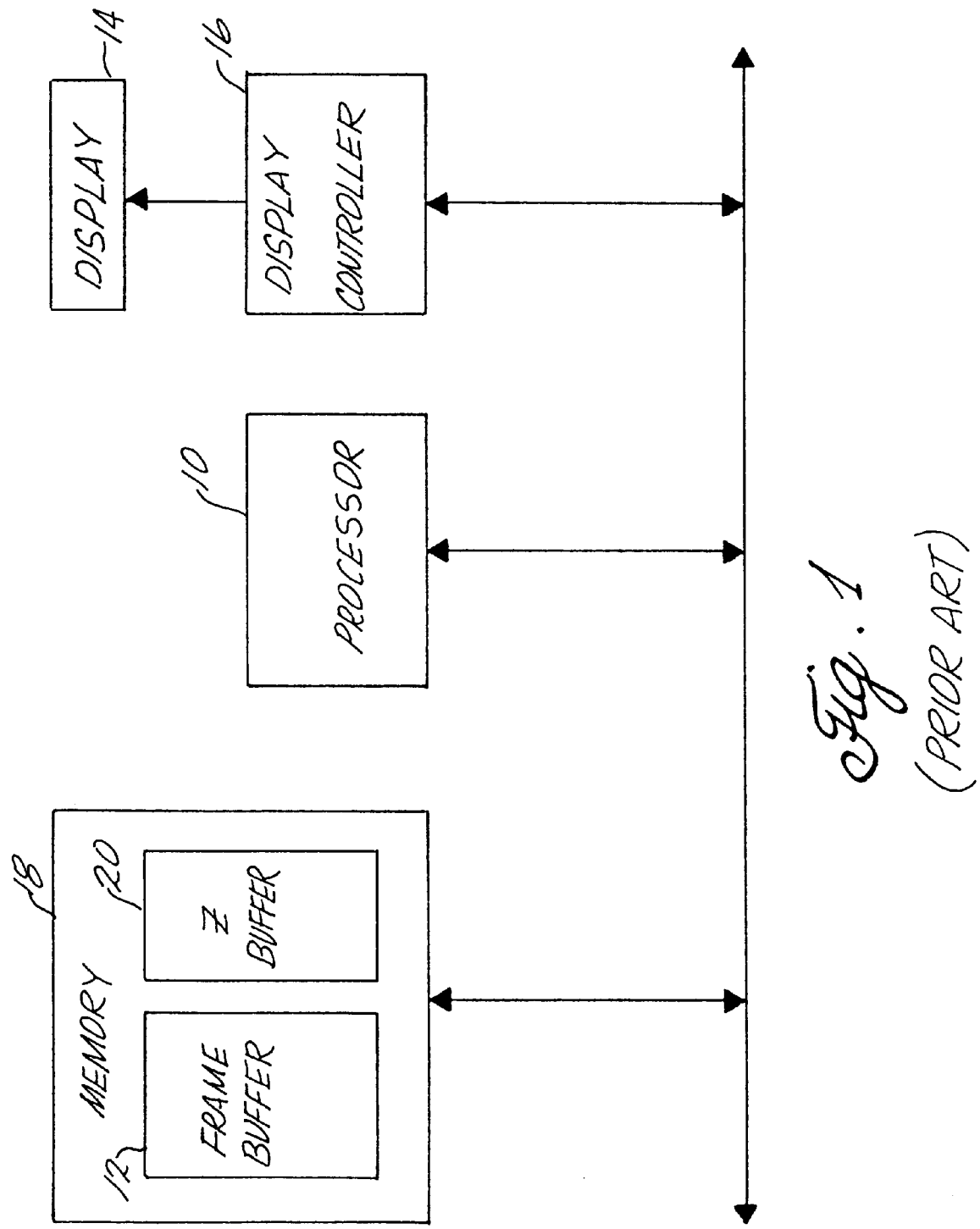
FIG. 1 is a simplified, semi-schematic block diagram of an exemplary graphics display system in the prior art.

In general terms, the present invention provides a system and method for reducing the number of z-buffer accesses during the generation and display of a three-dimensional graphical object. This is accomplished by identifying minimum and maximum depth values (z-values) of a group of pixels making up the object. Z-comparisons are then performed on the minimum and/or maximum z-values rather than on all the z-values in the group. This allows savings in computational cycles. Memory bandwidth is also saved because no z-read requests need be submitted to the display controller 16 (FIG. 1). By making z-comparisons on the minimum and/or maximum z-values only, generalization of the z-values of the remaining pixels in the group are often possible. If such generalization cannot be made, pixel-by-pixel z-comparisons of all the pixels in the group are then performed.

In the described embodiment, three-dimensional objects are represented by a set of vertices defining triangle surfaces. However, those skilled in the art will appreciate using other types of polygons, such as circles, squares, pentagons, hexagons, and the like, to represent a three-dimensional object.

Figure 2:
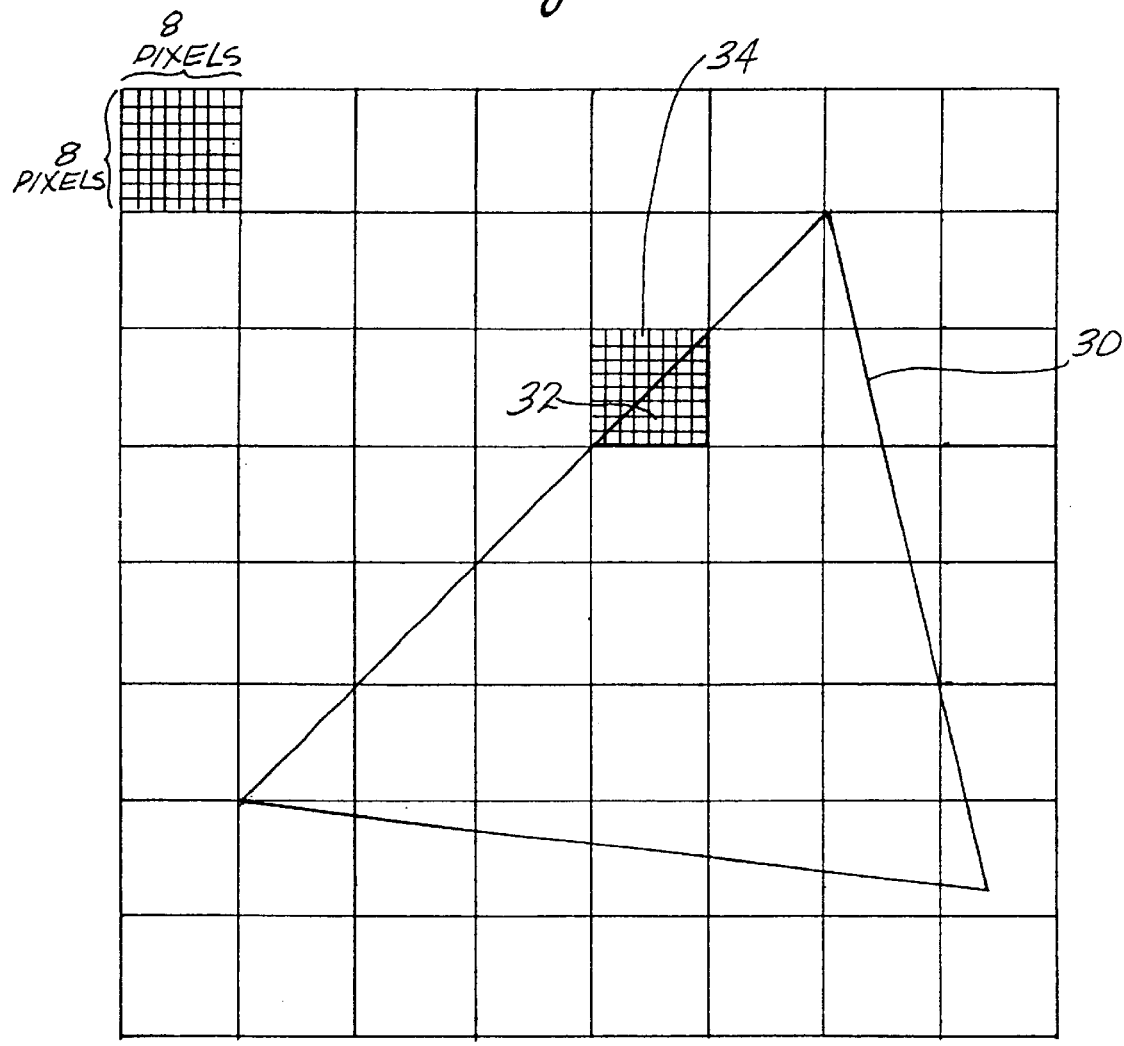
FIG. 2 is a simplified, semi-schematic diagram of an exemplary display screen partitioned into 8×8 pixel display blocks.

In accordance with an embodiment of the invention, a display screen is partitioned into one or more display blocks. The depth characteristic of each block is then explored. FIG. 2 is an exemplary screen partitioned into display blocks of 8 pixels by 8 pixels (8×8). Each 8×8 display block, therefore, contains 64 pixels. Alternative dimensions may also be utilized, such as 8×4, 16×4, 4×8, 4×4, or 16×8 blocks.

Each pixel in a display block is associated with either a front layer or a back layer. The front layer is comprised of pixels associated with a foreground of the screen. The back layer is comprised of pixels associated with a background of the screen. If only one layer is present in the block, it is represented as the back layer instead of the front layer. Initially, a block is empty and all pixels belong to a background which is represented as the back layer. As a new triangle is introduced to the block for display, the system compares the z-value range for the new triangle with the z-value ranges of the front and/or back layers. In this way, the system can determine the pixels in the new triangle which are visible and the pixels that are obscured by the other triangles.

Generally speaking, if the z-values of the new triangle do not intersect the z-ranges of a front layer and/or a back layer, the visible pixels in the display block, whether the already displayed triangle or the new triangle, can be identified without performing z-buffer reads. On the other hand, if the z-ranges intersect, conventional pixel-by-pixel z-comparisons are generally performed to determine which pixels of the new triangle are in front of the already displayed triangle and which pixels are hidden by the already displayed triangle. The pixels in the new triangle are then associated with either the front layer or the back layer. Generally speaking, if a pixel is in front of the front layer, it is associated with the front layer. If a pixel is between the front layer and the back layer, it is generally associated with the closer of the two layers. If a pixel is behind a back layer, it becomes associated with the back layer.

For instance, if the new triangle is located in front of the front layer, all of the pixels in the new triangle are visible and should be displayed. If this triangle does not cover all the pixels in the block, it will then be associated with the front layer for the block.

Group z-comparisons are accomplished through a z-range buffer (range buffer). In contrast to the z-buffer which stores the z-value of each pixel, the range buffer stores only four z-values for a block: a minimum z-value of a front layer of the block, a maximum z-value of the front layer of the block, a minimum z-value of a back layer of the block, and a maximum z-value of the back layer of the block. In addition, the range buffer stores a bitmask for the pixels in the block, indicating whether a specific pixel belongs to the front layer or the back layer. Because the z-range buffer is sufficiently compact to reside on-chip, no external reads to memory are required. This increases processing speed and decreases bus traffic.

Figure 3:
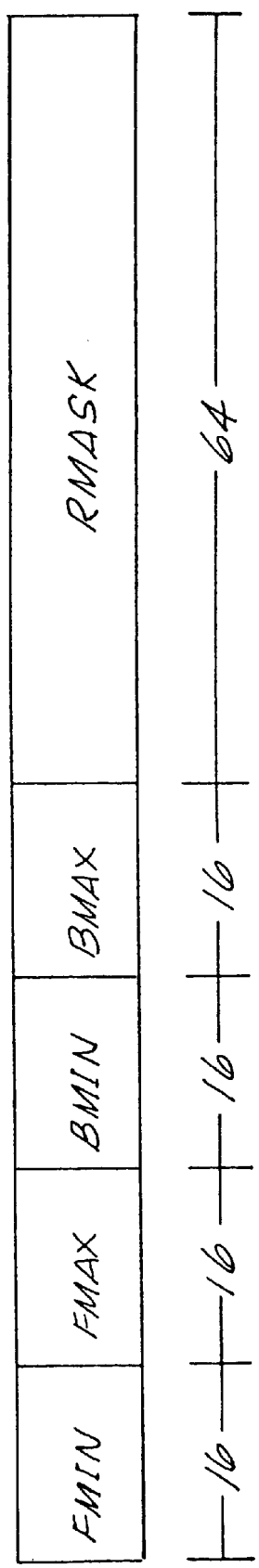
FIG. 3 is a conceptual layout diagram of a z-range buffer in accordance with practice of the present invention.

FIG. 3 is a diagram of a generalized range buffer. An FMIN field and an FMAX field store minimum and maximum z-values, respectively, of the front layer of a display block. Similarly, a BMIN field and a BMAX field store minimum and the maximum z-values, respectively, of the back layer of a display block. In the embodiment of FIG. 3, the FMIN, FMAX, BMIN, and BMAX fields each occupy sixteen (16) bits of storage space.

An RMASK field occupies 64 bits of storage space, with each bit corresponding to a pixel in an 8×8 block. Each bit is set to either a "0" or a "1" based on whether the corresponding pixel belongs to the back layer or the front layer, respectively, of the display block.

Figure 4:
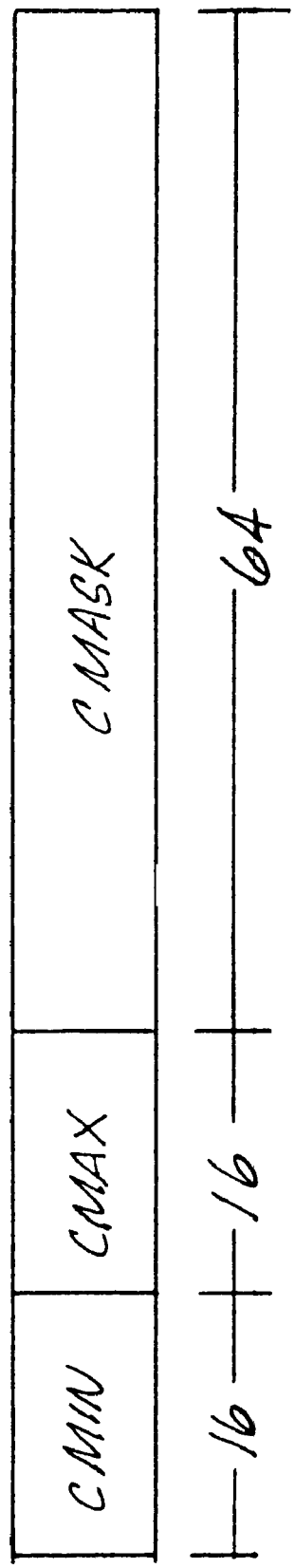
FIG. 4 is a conceptual layout diagram of a data structure for storing minimum and maximum z-values and bitmask values of a triangle in a display block.

FIG. 4 is a diagram of a generalized data structure for storing minimum and maximum z-values and bitmask values of a triangle 30, such as the one illustrated in FIG. 2, in a display block 34. A CMIN field and a CMAX field respectively represent the minimum and maximum z-values of pixels in the block 34 touched by the triangle 30. The CMIN and CMAX fields each occupy 16 bits of storage space. A CMASK field occupies 64 bits of storage space and is a bitmask representing the pixels 32 in the display block 34 touched by the triangle 30.

Figure 5:
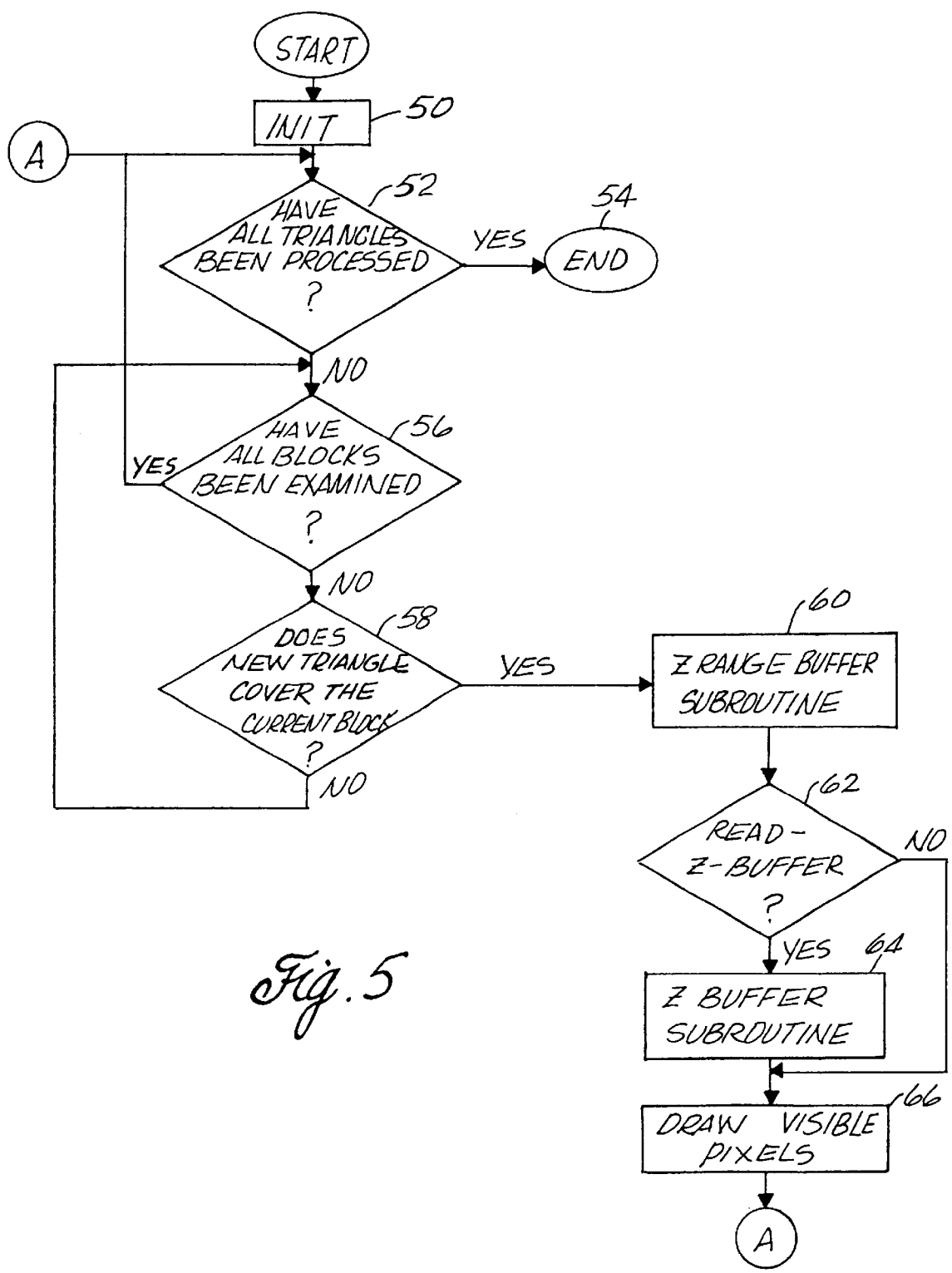
FIG. 5 is a process flow diagram of a computer graphics display routine in accordance with practice of the present invention.
Figure 6A:
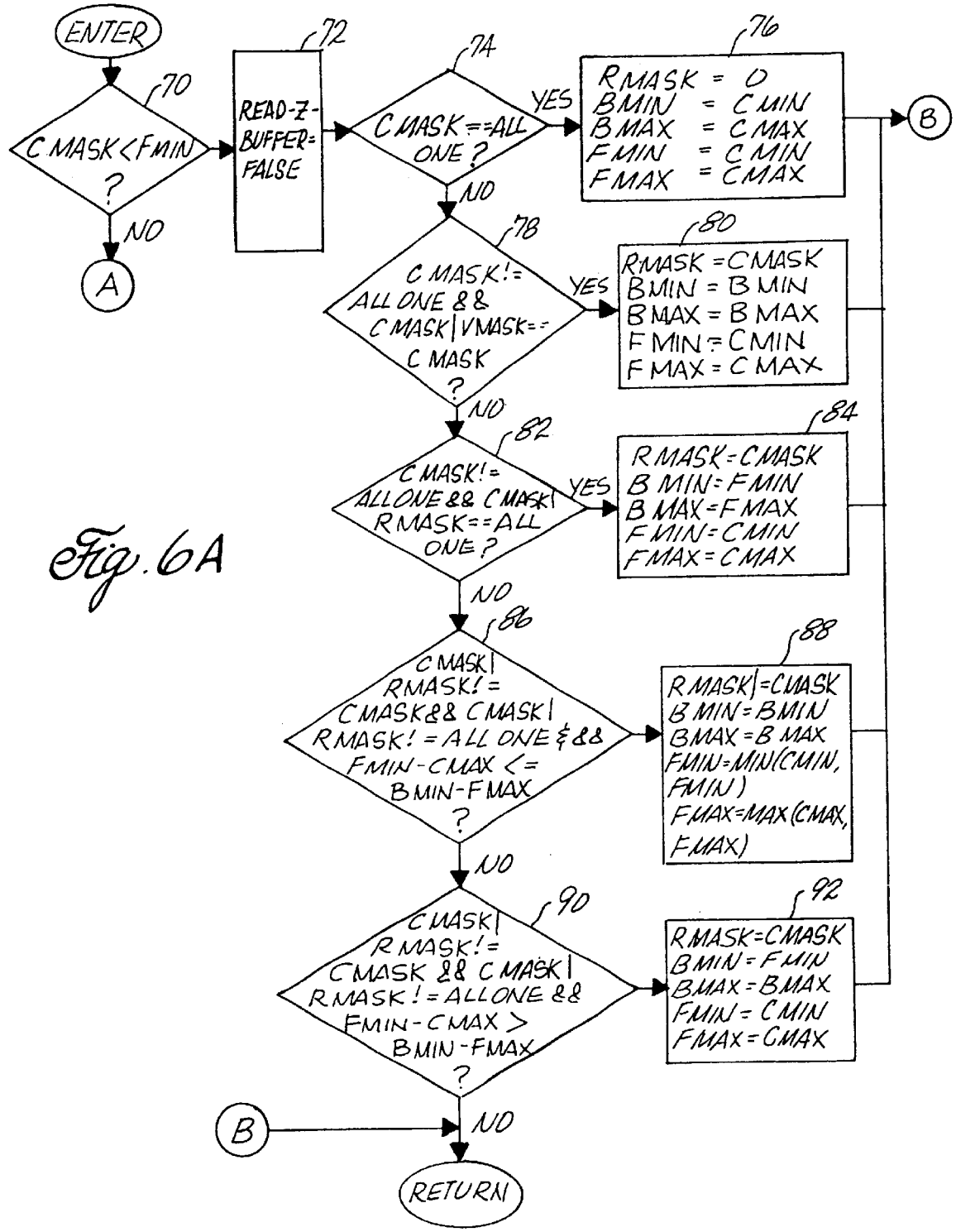
FIGS. 6A–6D are process flow diagrams of a Z-Range Buffer subroutine of FIG. 5.
Figure 6B:
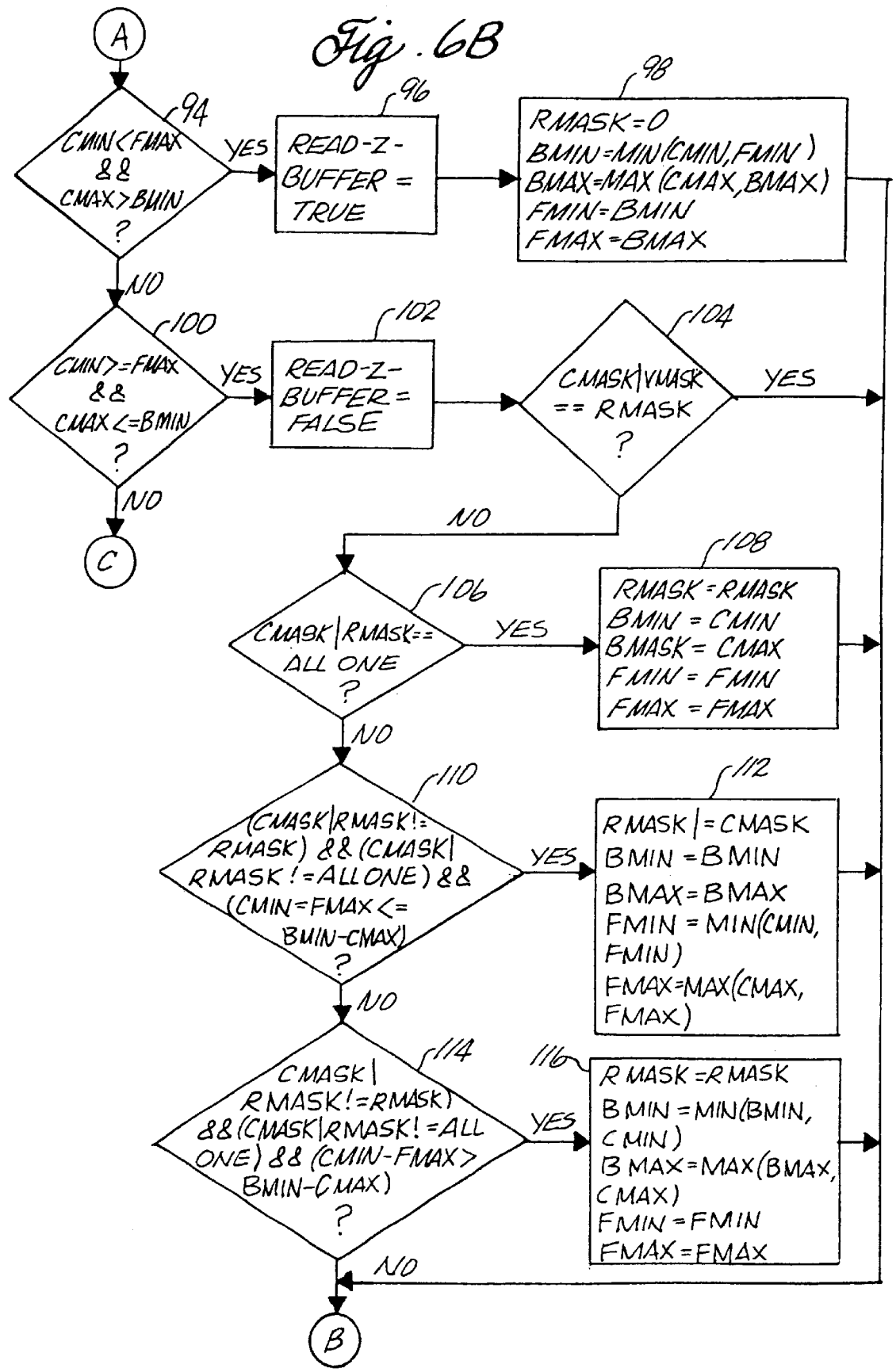
Figure 6C:
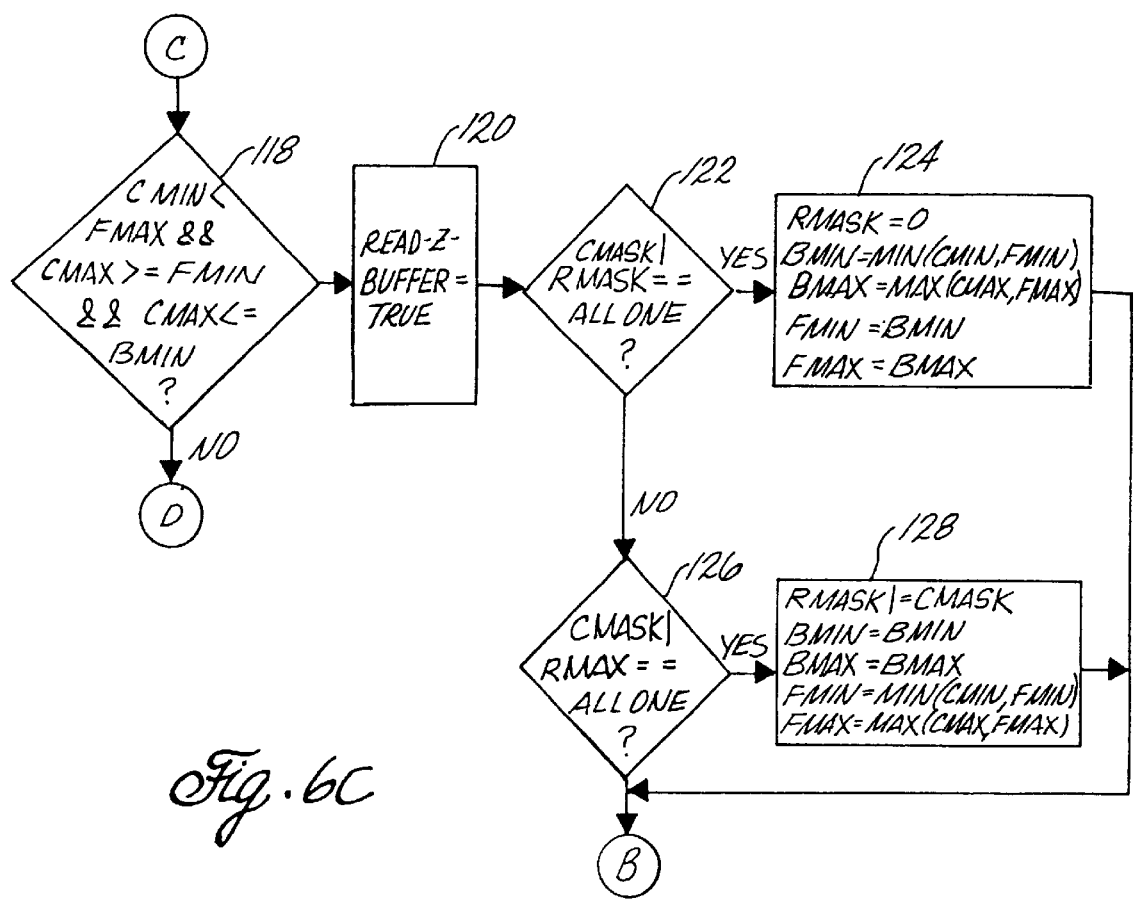
Figure 6D:
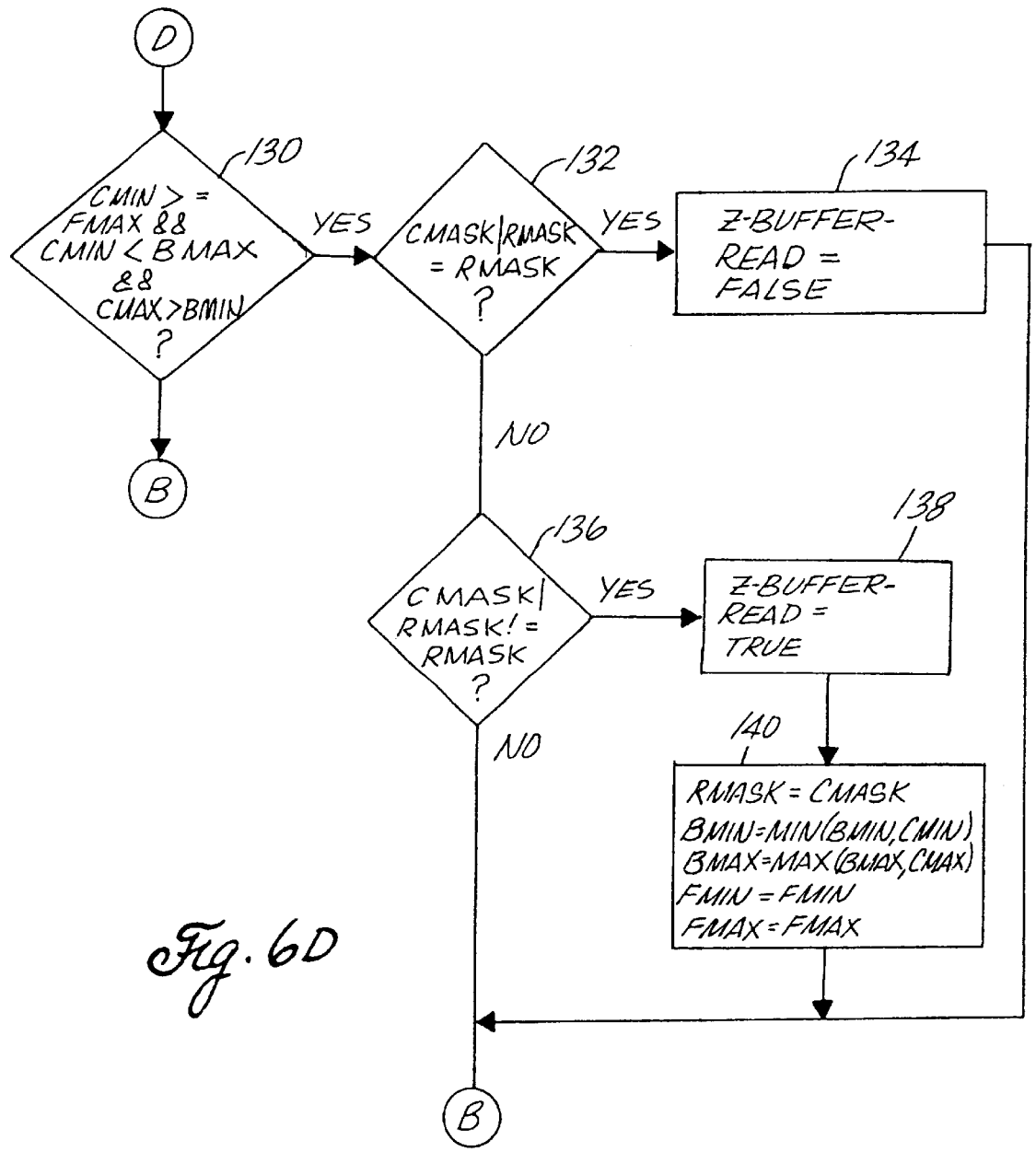

FIG. 5 is an exemplary flow diagram of a process according to the described embodiment. The process is described in terms of a computer program routine, but, those in the art would recognize, the process is generally implemented using logic circuitry in order to more rapidly complete the process. Indeed, in one embodiment the present invention is implemented in a digital circuit topology. The digital circuit topology is comprised of logic gates and memory elements, with the logic gates and memory elements forming a Z-range buffer in a single integrated circuit.

The process begins with an empty screen and initializes 50 the FMIN, FMAX, BMIN, and BMAX values of each block to the maximum possible z-value, i.e. the z-value of the background. In the described embodiment, the maximum z-value is "1" and the minimum z-value is "0." Accordingly, the permissible z-values range over a normalized set of values between 0 and 1 inclusively. Those skilled in the art will recognize that other ranges could also be used. The RMASK field for each block is also initialized to "0", depicting that all the pixels belong to the back layer which is initially the background.

The process next inquires whether all the triangle surfaces making up a three-dimensional object to be drawn have been processed 52. If they have, the process ends 54. Otherwise, the process takes a new triangle and examines the display blocks covered by the triangle. If all the blocks have been examined, the next triangle is processed as indicated by the YES branch to decision diamond 56. Otherwise, the process inquires whether the new triangle covers 60 a display block currently being examined 58. A Z-Range Buffer subroutine is invoked upon an affirmative answer. If the answer is negative, as indicated by the NO branch to decision diamond 58, the process advances to examine the next block.

As explained in further detail below, the Z-Range Buffer subroutine sets a Read-Z-Buffer boolean to either TRUE or FALSE, and updates the range buffer. The Read-Z-Buffer is used to determine if pixel-by-pixel z-comparisons are necessary. The main process checks the Read-Z-Buffer boolean 62 after the execution of the subroutine to make this determination. If the Read-Z-Buffer boolean has been set to TRUE, the process invokes a Z-Buffer subroutine 64 for performing the pixel-by-pixel comparisons. The process then proceeds to write the z-values of the pixels which are not hidden from view into the Z-Buffer 66 and draw those pixels in the place of the old pixels on the display. On the other hand, if the Read-Z-Buffer boolean has been set to FALSE, pixel-by-pixel comparisons of z-values are not necessary.

FIGS. 6A–6D are exemplary process flow diagrams of the Range Buffer subroutine 54 of FIG. 5. The subroutine begins by inquiring whether the CMAX value is less than the FMIN value 70. This is to test if the new triangle in the display block is closer to the viewpoint than the front layer. If the answer is YES, the Read-Z-Buffer boolean is set to FALSE and the pixels in the block associated with the new triangle (hereinafter referred to as the new pixels) are rejected as not needing pixel-by-pixel z-buffer comparisons. The new pixels can thus be displayed in the place of the old pixels.

Figure 7:
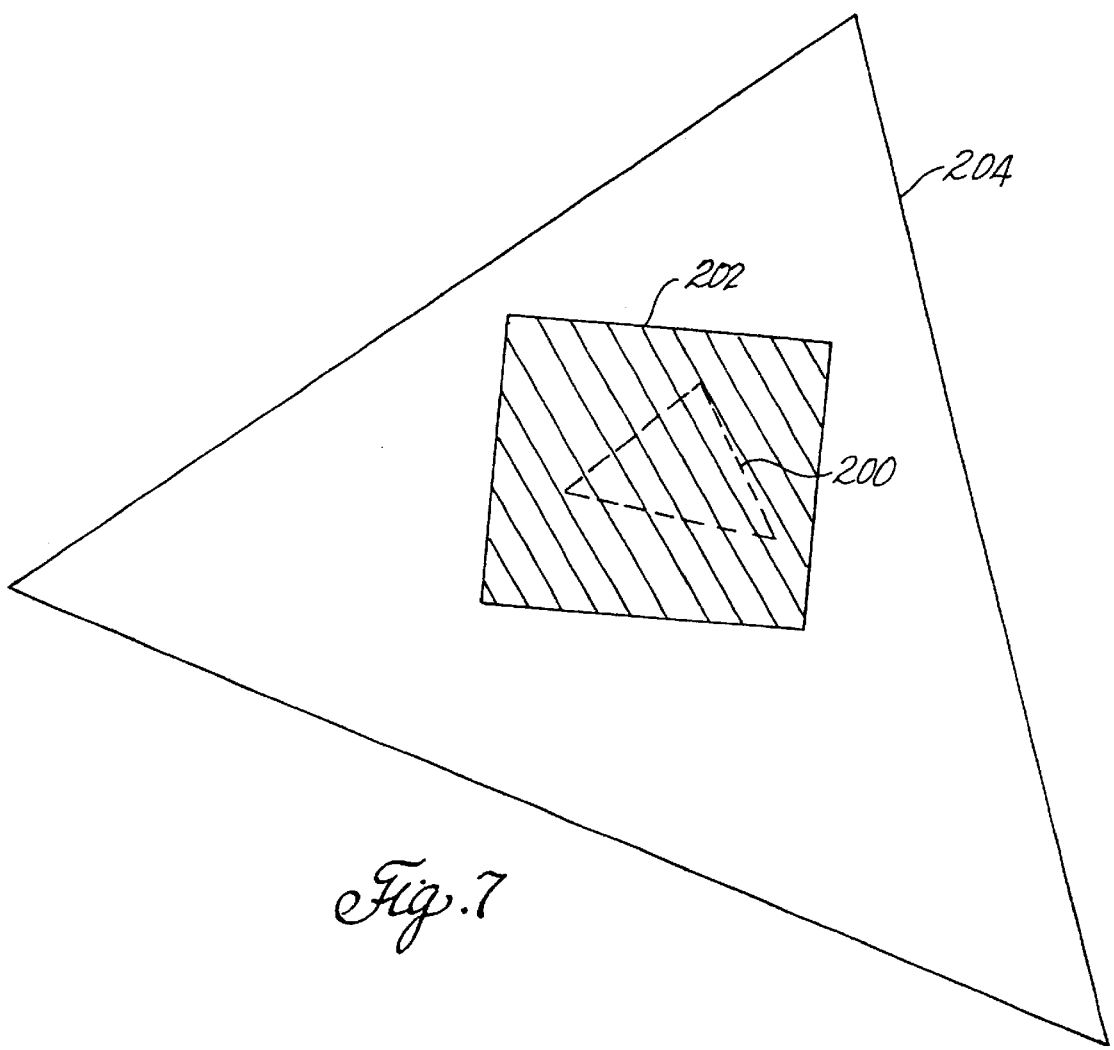
FIG. 7 is an exemplary illustration of a triangle closer to the viewpoint than a front layer and covering all the pixels of a block.

The subroutine next updates the range buffer by first asking whether all the bits of the CMASK have been set to "1" in step 74. A YES answer indicates that the new triangle covers all the pixels of the display block as illustrated in FIG. 7. Thus, any currently displayed object 200 in the block 202 is hidden from view by the new triangle 204. In this case, only one layer exists, namely, the layer made up by the new triangle 204, and that layer is set as the back layer by assigning a value of "0" to the RMASK field in step 76. In addition, the minimum z-values of the front and back layers, FMIN and BMIN, are set to the minimum z-value CMIN of the new triangle, and the maximum z-values of the front and back layers, BMAX and FMAX, are set to the maximum z-value CMAX of the new triangle in step 76. The subroutine then returns to the main process of FIG. 5.

Figure 8:
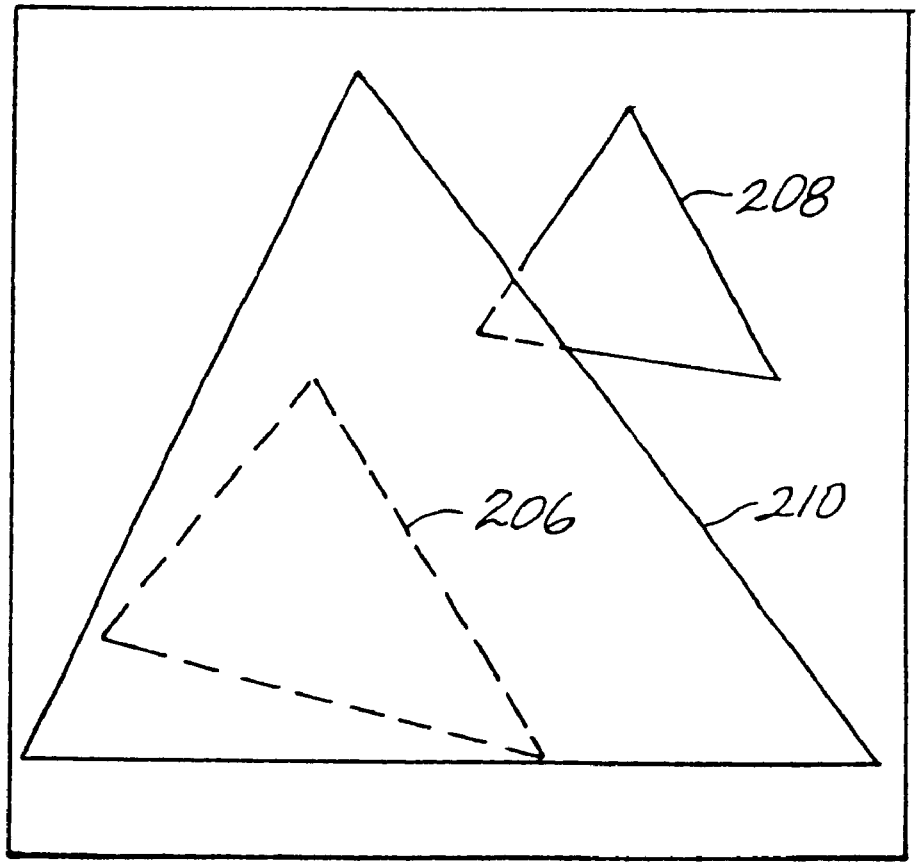
FIG. 8 is an exemplary illustration of a triangle closer to the viewpoint than a front layer and covering at least all the pixels of the front layer.

If, however, the new triangle does not cover all the pixels of the display block, the subroutine proceeds to investigate whether the new triangle covers at least all the pixels belonging to the front layer 78. This scenario is illustrated in FIG. 8. The new front layer 206 and part of the new back layer 208 are obscured by the new triangle 210. In this instance, the new pixels become the new front layer by making RMASK=CMASK in step 80. Accordingly, FMIN is set to CMIN, and FMAX is set to CMAX 80. The back layer 208 minimum and maximum values remain the same 80. The subroutine then returns to the main process.

Figure 9:
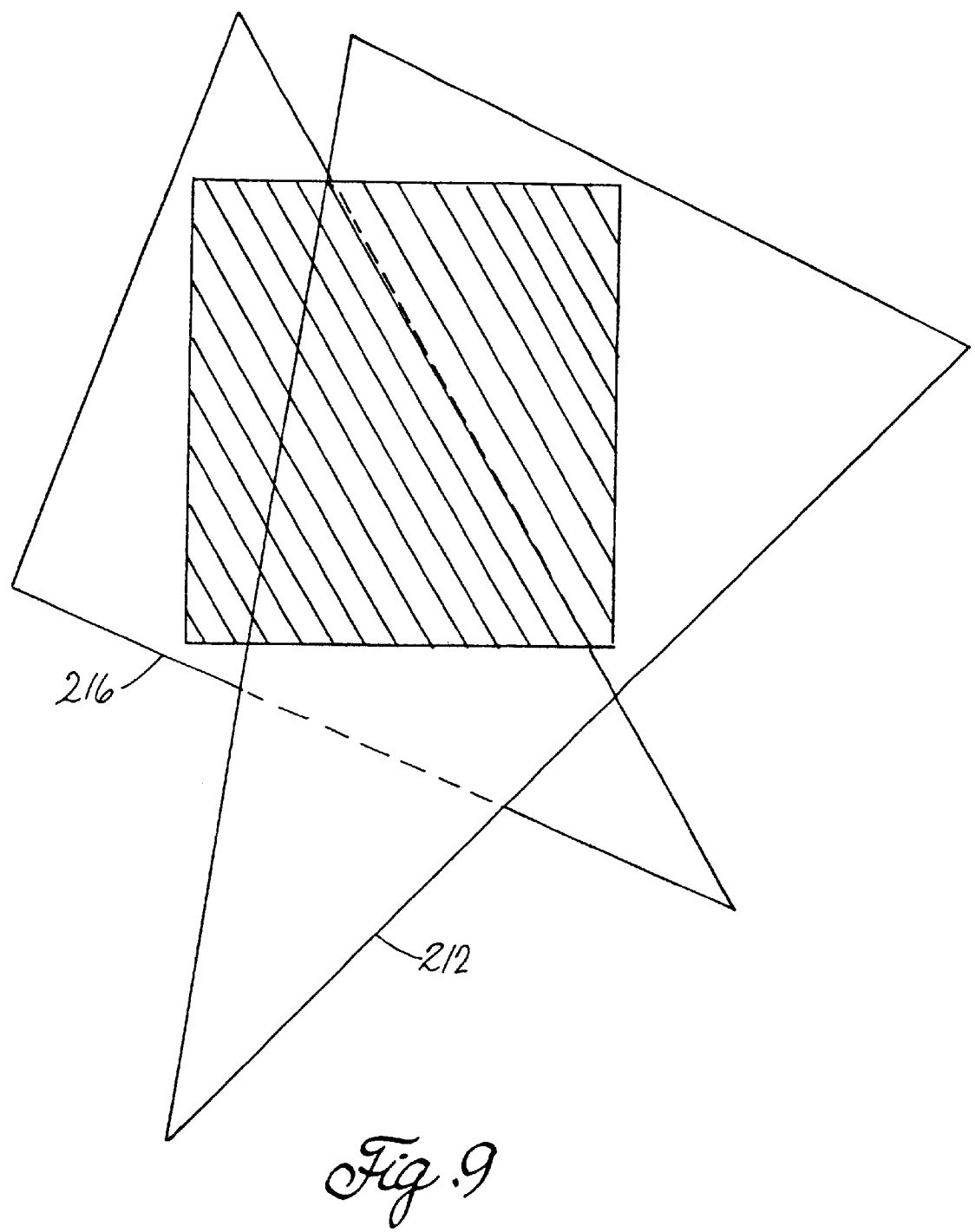
FIG. 9 is an exemplary illustration of a triangle closer to the viewpoint than a front layer and covering at least all the pixels of the back layer.

If the new triangle does not cover at least the pixels belonging to the front layer, the subroutine next examines whether the new triangle covers at least all the pixels belonging to the back layer 82. This scenario is illustrated in FIG. 9. In this particular example, the back layer is the previously exposed background of the display block 214. The new triangle 212 covers all of the back layer and part of the front layer 216. In this situation, the front layer 216 becomes the new back layer by making BMIN=FMIN and BMAX=FMAX in step 84. As in the previous case, the pixels in the display block 214 covered by the new triangle 212 then become the new front layer by making RMASK= CMASK 84. The FMIN and FMAX values are also respectively set to the CMIN and CMAX values 84, and the subroutine returns to the main process.

Figure 10:
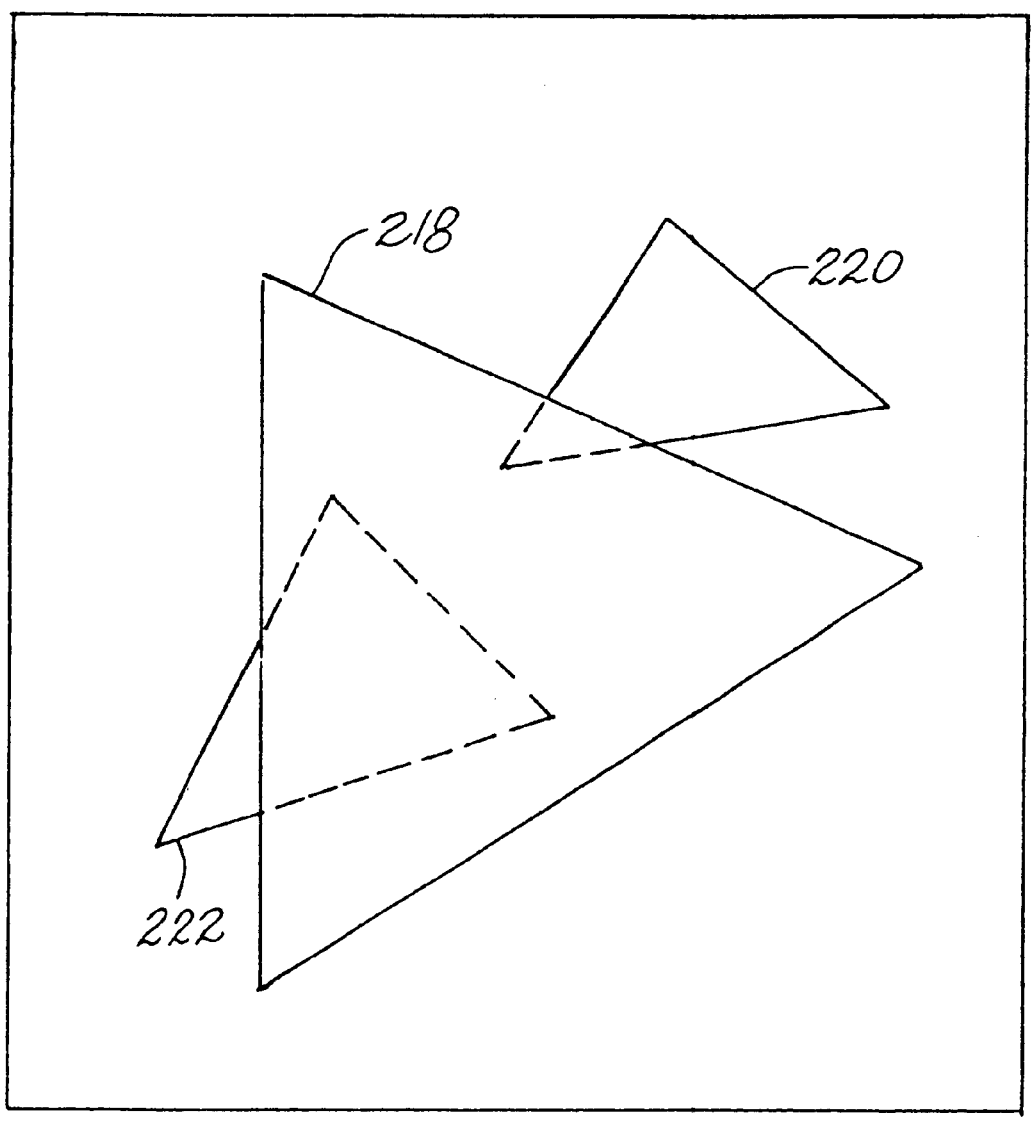
FIG. 10 is an exemplary illustration of a triangle closer to the viewpoint than a front layer and covering a portion of the pixels belonging to the front and back layers.

If neither the front nor back layers are completely covered by the new triangle, the subroutine next inquires whether the new triangle covers a portion of the front layer and a portion of the back layer, and whether the distance between FMIN and CMAX is less or equal to the distance between BMIN and FMAX 86. FIG. 10 illustrates an instance where such conditions are satisfied. In this case, the new pixels are set as part of the front layer 222 by making RMASK|=CMASK in step 88. The new FMIN value becomes the minimum of the CMIN and FMIN values, and the new FMAX value becomes the maximum of the CMAX and FMAX values 88. The BMIN and BMAX values remain intact 88, and the subroutine returns to the main process.

However, if the distance between FMIN and CMAX is greater than the distance between BMIN and FMAX as inquired in decision diamond 90, the pixels associated with the front layer 222 which are not covered by the new triangle 218 become associated with the back layer 220 by making RMASK=CMASK in step 92. The new pixels then become the new front layer. The minimum and maximum z-values of both layers are also updated by setting BMIN=FMIN, FMIN=CMIN, and FMAX=CMAX 92. The value of BMAX remains the same 92, and the subroutine returns to the main process.

Figure 11:
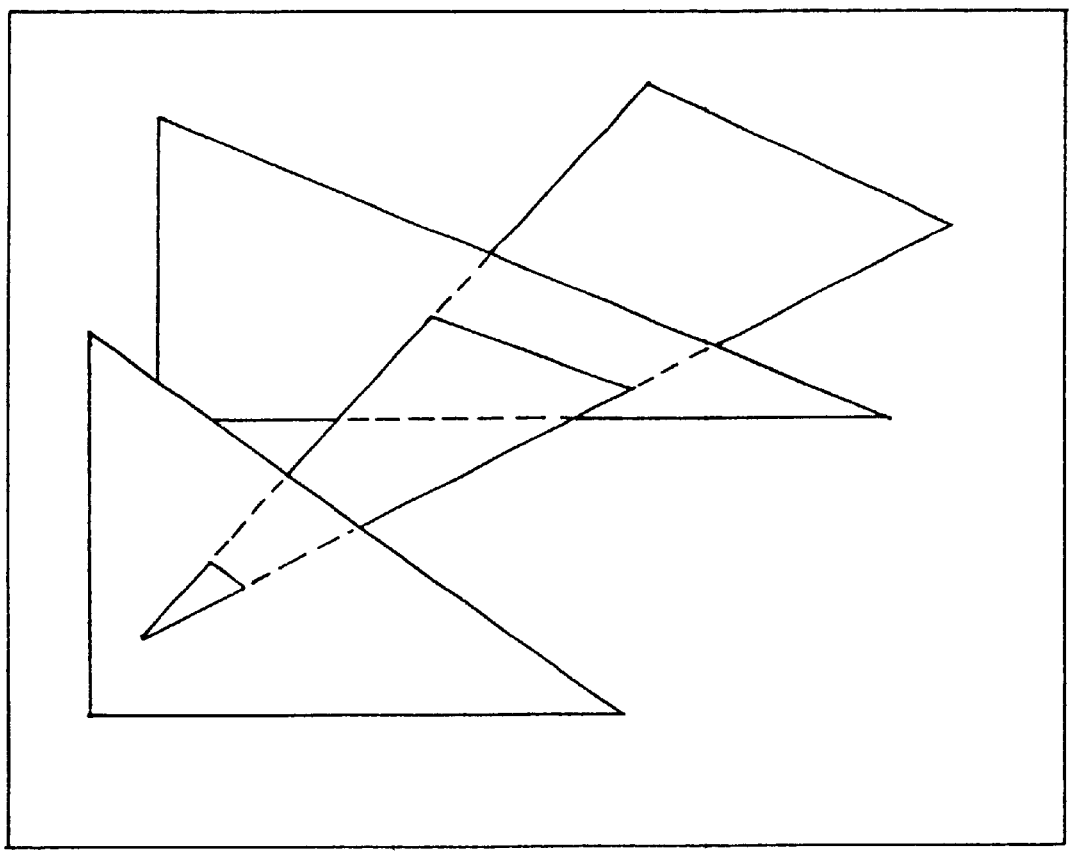
FIG. 11 is an exemplary illustration of pixels in a triangle whose z-values intersect with the z-ranges of the front and back layers.

Referring back to decision diamond 70, if the new triangle in the display block is not closer to the viewpoint than the front layer, the subroutine inquires whether CMIN is less than FMAX, and whether CMAX is greater than BMIN 94. If the answer is YES, the z-ranges of the new triangle intersect with the z-ranges of the front and back layers as illustrated in FIG. 11. Thus, a z-buffer read must be done to determine which pixels are hidden from view and which pixels are not. Accordingly, the Read-Z-Buffer boolean is set to TRUE 96, and the subroutine proceeds to update the range buffer. The new pixels along with the pixels associated with the front layer become the new back layer by making RMASK="0" in step 98. The new BMIN and FMIN values are set to the smaller of the CMIN and old FMIN values 98. The new BMAX and FMAX values are set to the bigger of the CMAX and old BMAX values 98. The subroutine then returns to the main process.

Figure 12:
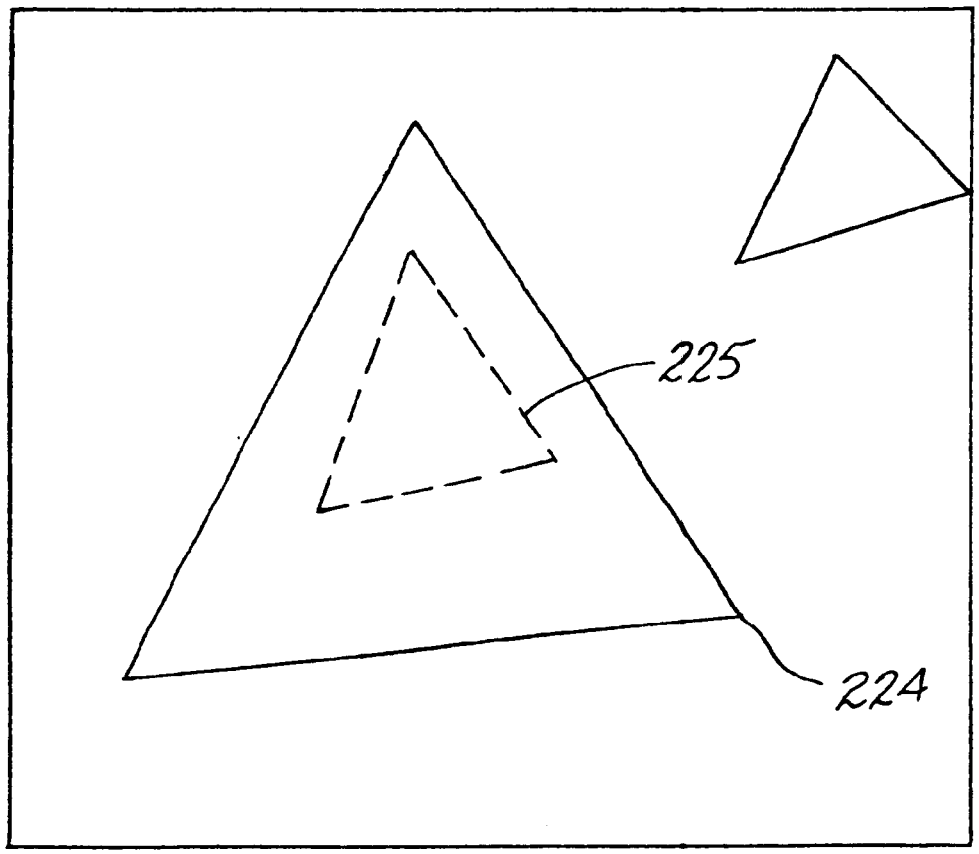
FIG. 12 is an exemplary illustration of a triangle further from the viewpoint than a front layer but closer to the viewpoint than a back layer, whose pixels are entirely covered by the front layer.

Referring back to decision diamond 94, if the answer to the inquiry of whether CMIN<FMAX and CMAX>BMIN is NO, the subroutine next inquires whether CMIN>=FMAX and CMAX<=BMIN 100. If the answer is YES, the new triangle is further from the viewpoint than the front layer, but closer to the viewpoint than the back layer. Because the z-ranges do not intersect, the subroutine proceeds to set the READ-Z-BUFFER boolean to FALSE 102. Next, the subroutine updates the range buffer by first inquiring whether the new pixels are all covered by the front layer 102. This case is depicted by FIG. 12. The illustrated triangle 225 is completely covered from view by the front layer 224 and thus, will not be displayed by the main process of FIG. 5. In this case, no updates to the range buffer is necessary and the subroutine simply returns in step 104.

Figure 13:
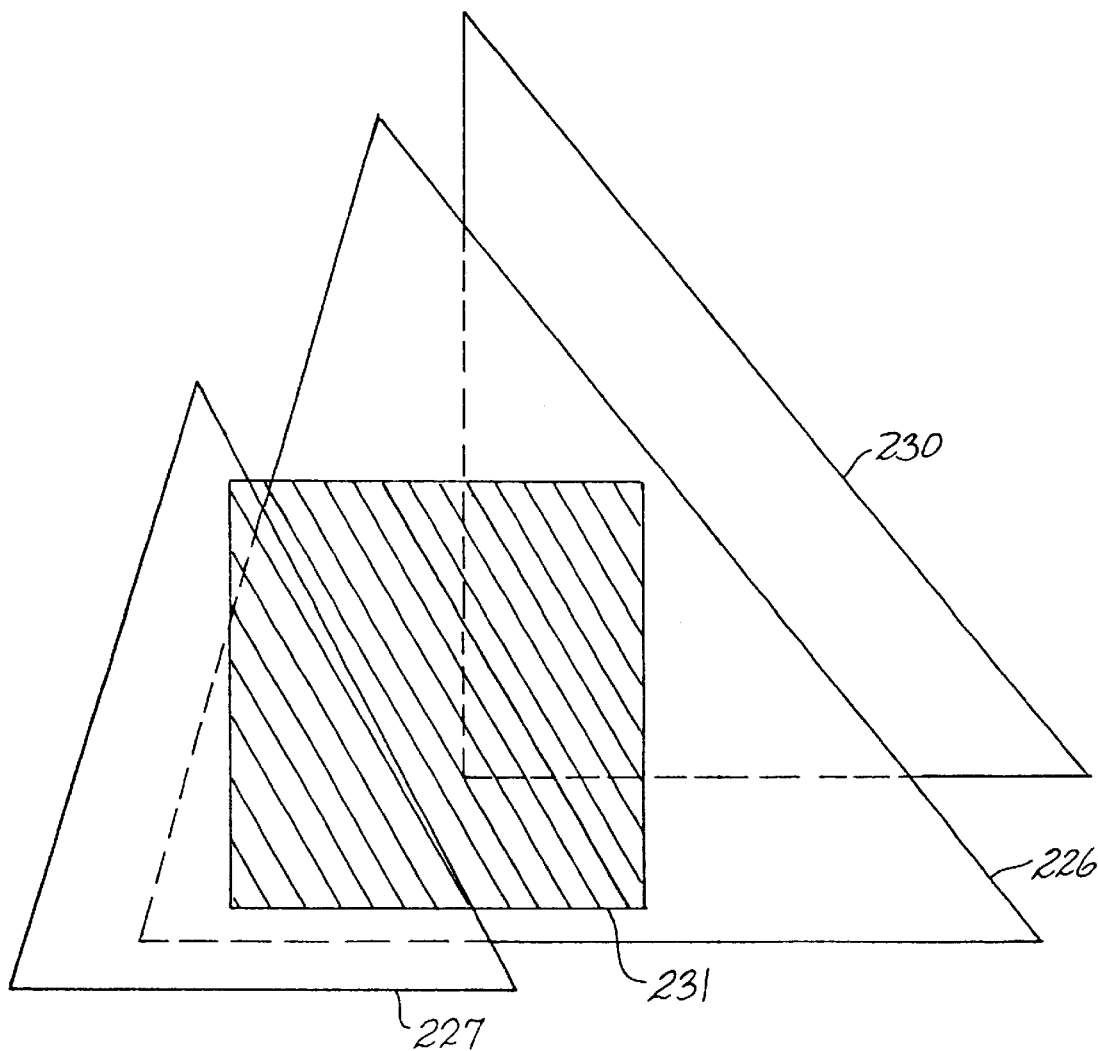
FIG. 13 is an exemplary illustration of a triangle further from the viewpoint than a front layer but closer to the viewpoint than a back layer, whose pixels entirely cover the back layer.

Otherwise, if the new pixels are not all covered by the front layer, the subroutine next inquires whether the new triangle covers all the pixels in the back layer 106. Because the new pixels not covered by the front layer 227 are all visible, those pixels can all be displayed. FIG. 13 depicts this situation. The triangle 226 covers all of the back layer comprising a back layer triangle object 230 and the uncovered pixels of the display block 231 making up the background. In this case, the RMASK value and front layer minimum and maximum values remain the same 108. However, the BMIN and BMAX values are set to CMIN and CMAX, respectively, because the new pixels are now associated with the new back layer 108. The subroutine then returns to the main process.

Figure 14:
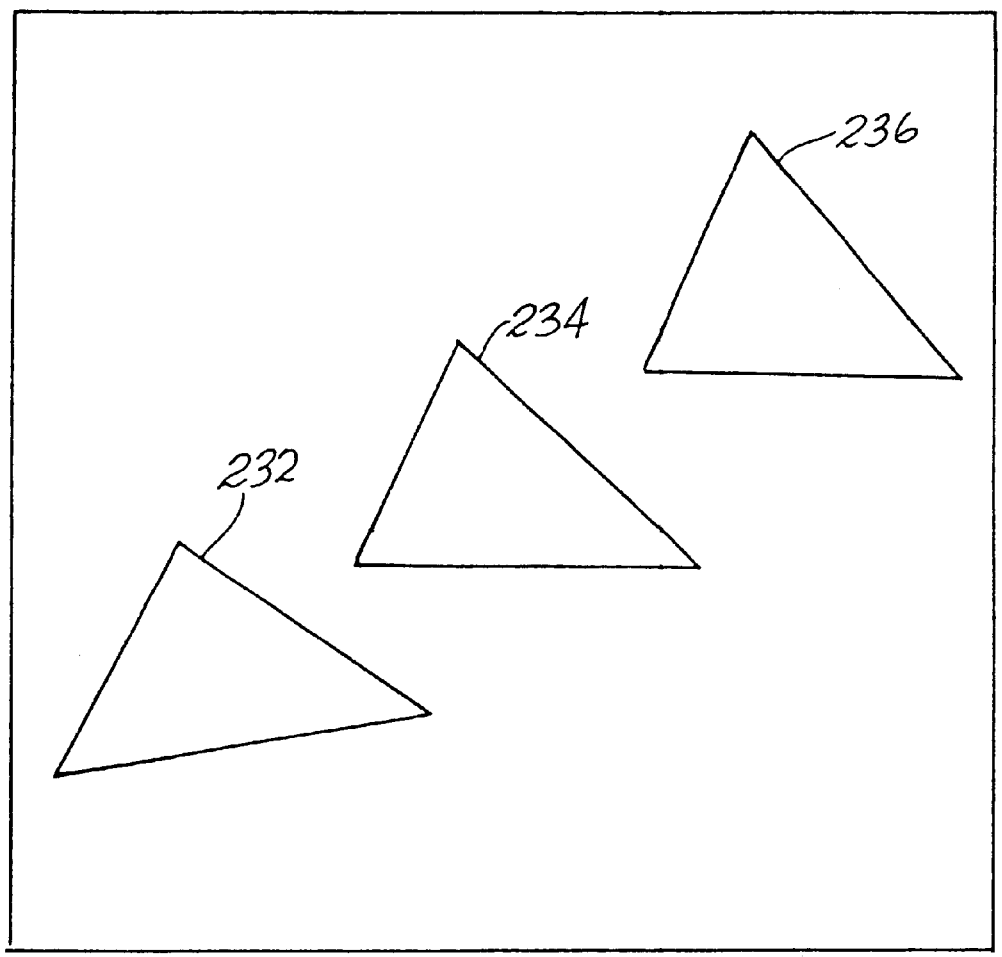
FIG. 14 is an exemplary illustration of a triangle further from the viewpoint than a front layer but closer to the viewpoint than a back layer, that does not fully cover all of the back layer and is not fully covered by the front layer.

If the answer to the question of whether the new triangle covers all of the back layer is NO, the subroutine next tests if the new triangle fails to fully cover all of the back layer and further fails to be fully covered by the front layer 110. The subroutine also inquires whether the difference between the CMIN and FMAX values is less than the difference between the BMIN and CMAX values 110. Because the front layer 232 at most covers only a portion of the new pixels making up the new triangle 234, the uncovered pixels are visible and thus, displayed. This scenario is illustrated by FIG. 14. In this example, the new triangle 234 is not covered by the front layer 232, and does not cover the back layer 236. Thus, if the answer to the inquiry posed in decision diamond 110 is YES, the subroutine proceeds to set the pixels covered by the new triangle 234 as part of the front layer 232 by making RMASK |=CMASK in step 112. The new FMIN value becomes the minimum of the CMIN and FMIN values, and the new FMAX value becomes the maximum of the CMAX and FMAX values 112. The BMIN and BMAX values remain intact 112, and the subroutine returns.

However, if the distance between FMIN and CMAX is greater than the distance between BMIN and FMAX as inquired in decision diamond 114, the RMASK value remains the same, thereby continuing to associate the new pixels with the back layer 116. The front layer's minimum and maximum values also remain the same 116. However, the new BMIN value is set to the smaller of the old BMIN and CMIN values 116, and the new BMAX value is set to the larger of the old BMAX and CMAX values 116, respectively. The subroutine then returns to the main process.

Referring back to decision diamond 100, if the answer to the inquiry of whether CMIN>=FMAX && CMAX<=BMIN is NO, the subroutine proceeds to investigate whether CMIN<FMAX && CMAX>=FMIN && CMAX<=BMIN 118. If the answer is YES, the z-ranges of the new pixels intersect with the z-ranges of the front layer but not the back layer. Thus, the Read-Z-Buffer boolean is set to TRUE 120.

Figure 15:
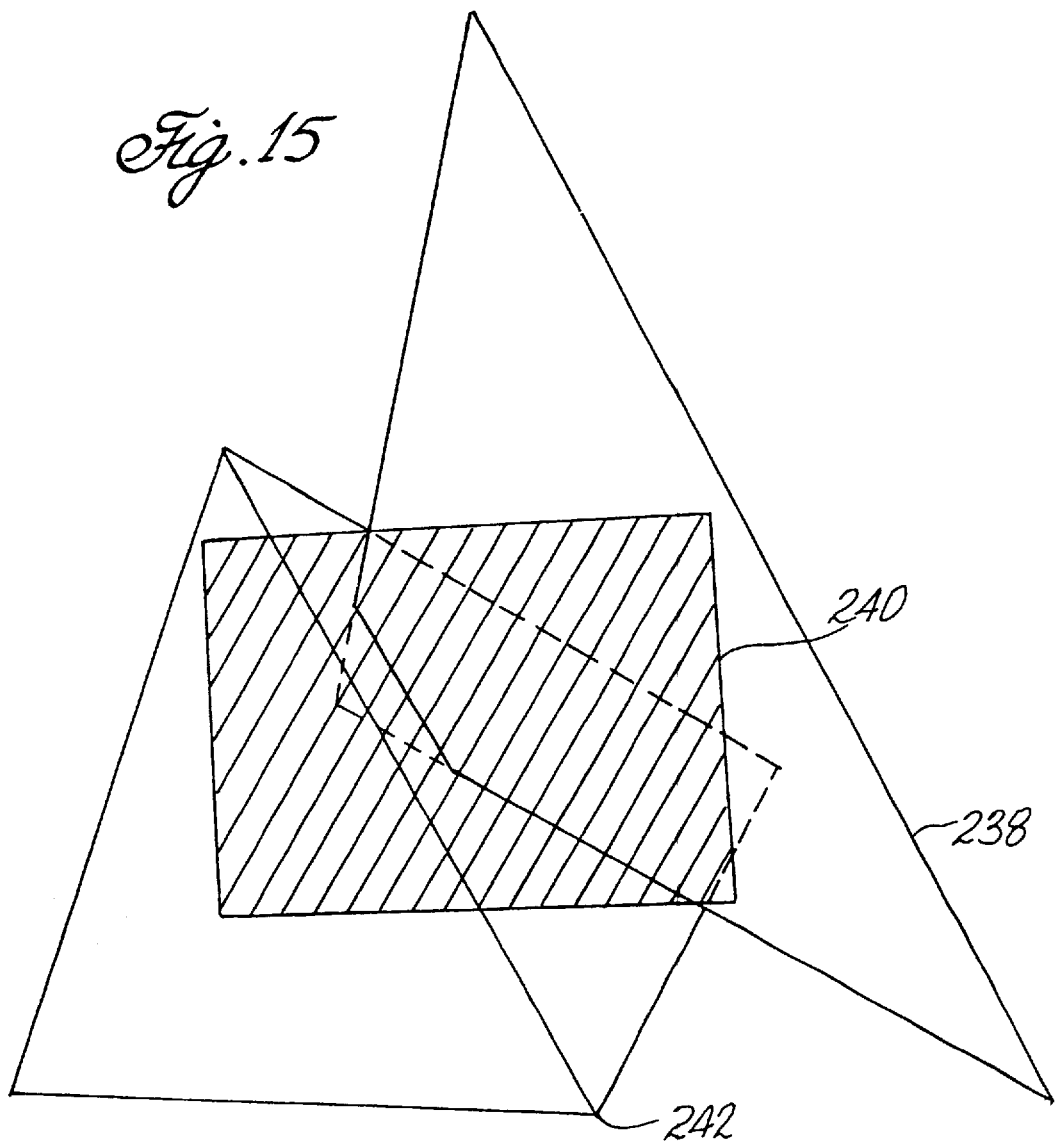
FIG. 15 is an exemplary illustration of pixels of a triangle whose z-ranges intersect with the z-ranges of the front layer but not the back layer, and whose pixels cover all of the back layer.

The subroutine then proceeds to update the range buffer by asking in decision diamond 122, whether the new triangle 238 covers all the pixels in the back layer as illustrated in FIG. 15. The back layer in this particular example is the background portion of the display block 240 not covered by the front layer 242. If the answer is YES, the RMASK value is set to "0" 124, thus, merging the new pixels making up the triangle 238 and the pixels in the front layer 242, into a single layer which becomes the block's new back layer. The new BMIN and FMIN values are both set to the smaller of the CMIN and old FMIN values 124. The new BMAX and FMAX values are both set to the bigger of the CMAX and old FMAX values 124, and the subroutine returns.

If, however, the new triangle does not cover all the pixels in the back layer as inquired in decision diamond 126, the new pixels are set as part of the front layer by making RMASK |=CMASK 128. The new FMIN value becomes the minimum of the CMIN and FMIN values, and the new FMAX value becomes the maximum of the CMAX and FMAX values 128. The BMIN and BMAX values remain intact 128. The subroutine then returns to the main process.

Figure 16:
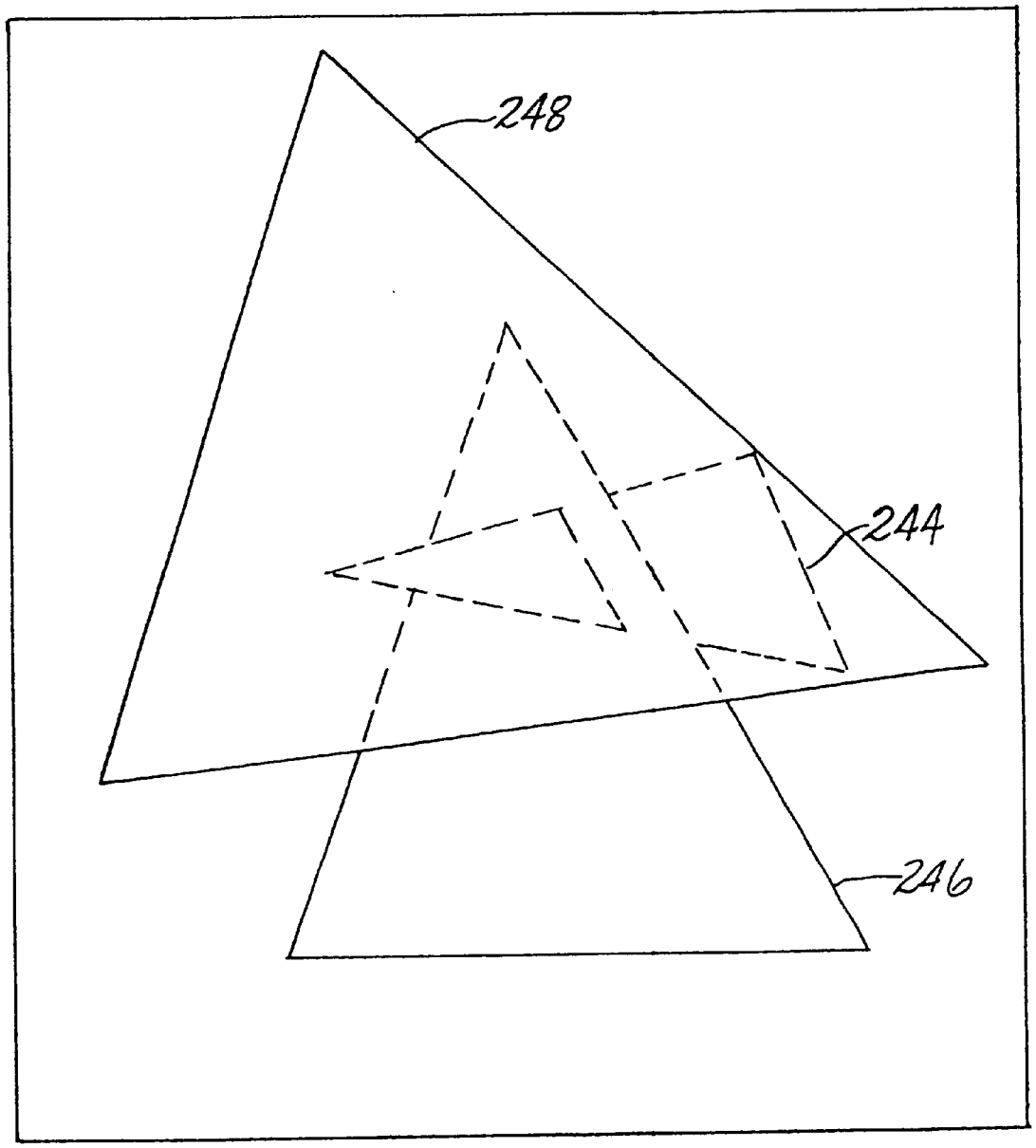
FIG. 16 is an exemplary illustration of pixels of a triangle whose z-ranges intersect with the z-ranges of the back layer but not the z-ranges of the front layer, and whose pixels are all covered by the front layer.

Going back to decision diamond 118, the NO branch of this diamond causes the subroutine to inquire whether CMIN>=FMAX && CMIN<BMAX && CMAX>BMIN 130. A YES answer indicates that the z-ranges of the new pixels intersect with the z-ranges of the back layer but not the z-ranges of the front layer. The subroutine thus proceeds to inquire whether the front layer covers all the new pixels making up the new triangle in step 132. A YES answer sets the Z-Buffer-Read variable to FALSE 134 because the new pixels are obscured by the front layer. This scenario is illustrated in FIG. 16. The z-values of the new pixels making up the new triangle 244 intersect with a back layer 246. However, those pixels are hidden from view by a front layer 248. No updates to the range buffer are necessary, and the subroutine simply returns.

A NO answer causes the subroutine to ask in step 136 whether the front layer does not cover all the new pixels. In this case, the Z-Buffer-Read boolean is set to TRUE 138 because pixel-by-pixel comparisons of the z-values of the new pixels with the z-values in the z-buffer should be performed. The process next updates the range buffer by setting the new BMIN value to the smaller of the old BMIN and CMIN values, and setting the new BMAX value to the bigger of the old BMAX and CMAX values in step 140. The RMASK, FMIN, and FMAX values remain the same 140. The subroutine then returns to the main process.

Accordingly, there has been brought to the art of computer graphics display systems, a system and method that allows hidden surface removal of a three-dimensional graphical object without initializing the z-buffer, and which reduces the number of z-buffer accesses during the generation and display of the graphical object. Instead of performing comparisons of z-values of all the pixels of a new triangle making up the graphical object, minimum and maximum z-values of the triangle are compared against minimum and maximum z-values of front and/or back layers stored in a substantially smaller z-range buffer. This allows savings in computational cycles as well as in memory bandwidth.

Although this invention has been described in certain specific embodiments, those skilled in the art will have no difficulty devising variations which in no way depart from the scope and spirit of the present invention. For instance, instead of only using two layers corresponding to a front and a back layer, one skilled in the art might appreciate using one, three, or more layers of a block for comparing z-range values. A person skilled in the art will also appreciate that the z-range buffer will have to be modified to store the minimum and maximum z-values of all the layers used.

It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. In a computer graphics display system comprising a display monitor, a method of detecting hidden surfaces of a polygon in a display block, the polygon having depth values corresponding to a minimum depth value and a maximum depth value, the method comprising:

partitioning a screen of the display monitor into a plurality of display blocks having one or more layers of pixels;

storing in a z-range buffer minimum and maximum depth values for the layers in the block, the z-range buffer further storing a bitmask value, each bit in the bitmask value associating a pixel in the block to a layer in the block;

comparing a depth value of the polygon with a depth value of a particular layer in the block stored in the z-range buffer; and identifying visible pixels in the block making up the polygon based on the comparison.

2. The method of claim 1, wherein the polygon in the display block is a triangle.

3. The method of claim 1 further comprising the step of initializing the minimum and maximum depth values of the layers in the block to a depth value corresponding to a background of the block.

4. The method of claim 1, wherein the layers in the block comprise a first layer and a second layer, each pixel in the block being associated with either the first layer or the second layer, the first layer having depth values ranging from a first minimum depth value to a first maximum depth value, and the second layer having depth values ranging from a second minimum depth value to a second maximum depth value.

5. The method of claim 4, wherein the step of comparing depth values comprises determining whether the polygon is located closer to a viewpoint than a first layer.

6. The method of claim 4, wherein the step of comparing depth values comprises determining whether the polygon is further from the viewpoint than the first layer but closer to the viewpoint than the second layer.

7. The method of claim 4, wherein the step of comparing depth values comprises determining whether the depth value ranges of the polygon intersect with the depth value ranges of the first layer.

8. The method of claim 4, wherein the step of comparing depth values comprises determining whether the depth value ranges of the polygon intersect with the depth value ranges of the second layer.

9. The method of claim 1 further comprising the step of updating bits of the bitmask value, the bits corresponding to the pixels in the block making up the polygon.

10. The method of claim 1 further comprising the step of updating the minimum and maximum depth values of a layer in the block.

11. A computer graphics display interface for use with a computer system having a display monitor, the interface comprising:

a memory including a z-range buffer for storing minimum and maximum depth values of one or more layers of pixels of a display block, the z-range buffer further storing a bitmask value, each bit in the bitmask value associating a pixel in the block to a layer in the block; and a processor unit coupled to the memory for partitioning a screen of the display monitor into a plurality of display blocks having one or more layers of pixels, comparing a depth value of a polygon in a display block with a depth value of a particular layer in the block, and identifying visible pixels in the block making up the polygon based on the comparison.

12. The system of claim 11, wherein the polygon in the display block is a triangle.

13. The system of claim 11, wherein the layers in the block comprise a first layer and a second layer, each pixel in the block being associated with either the first layer or the second layer, the first layer having depth values ranging from a first minimum depth value to a first maximum depth value, and the second layer having depth values ranging from a second minimum depth value to a second maximum depth value.

14. In a graphics display system having a digital circuit topology having a set of primary input gates and a set of primary output gates, a method of detecting hidden surfaces of a polygon in a display block, the polygon having depth values corresponding to a minimum depth value and a maximum depth value, the method comprising:

storing in a z-range buffer minimum and maximum depth values for the layers in the block, the z-range buffer further storing a bitmask value, each bit in the bitmask value associating a pixel in the block to a layer in the block;

comparing a depth value of the polygon with a depth value of a particular layer in the block stored in the z-range buffer; and identifying visible pixels in the block making up the polygon based on the comparison.

15. The method of claim 14, wherein the polygon in the display block is a triangle.

16. The method of claim 14, further comprising the step of initializing the minimum and maximum depth values of the layers in the block to a depth value corresponding to a background of the block.

17. The method of claim 14, wherein the layers in the block comprise a first layer and a second layer, each pixel in the block being associated with either the first layer or the second layer, the first layer having depth values ranging from a first minimum depth value to a first maximum depth value, and the second layer having depth values ranging from a second minimum depth value to a second maximum depth value.

18. The method of claim 17, wherein the step of comparing depth values comprises determining whether the polygon is located closer to a viewpoint than a first layer.

19. The method of claim 17, wherein the step of comparing depth values comprises determining whether the polygon is further from the viewpoint than the first layer but closer to the viewpoint than the second layer.

20. The method of claim 17, wherein the step of comparing depth values comprises determining whether the depth value ranges of the polygon intersect with the depth value ranges of the first layer.

21. The method of claim 17 wherein the step of comparing depth values comprises determining whether the depth value ranges of the polygon intersect with the depth value ranges of the second layer.

22. The method of claim 17 further comprising the step of updating bits of the bitmask value, the bits corresponding to the pixels in the block making up the polygon.

23. The method of claim 17 further comprising the step of the minimum and maximum depth values of a layer in the block.

24. A computer-readable medium comprising:
a program code embodied in the computer readable medium for causing detection of hidden surfaces of a polygon in a display block, the polygon having depth values corresponding to a minimum depth value and a maximum depth value, the computer-readable program segment comprising instructions for performing the steps of:
storing in a z-range buffer minimum and maximum depth values for the layers in the block, the z-range buffer further storing a bitmask value, each bit in the bitmask value associating a pixel in the block to a layer in the block;
comparing a depth value of the polygon with a depth value of a particular layer in the block stored in the z-range buffer; and
identifying visible pixels in the block making up the polygon based on the comparison.

25. The computer-readable medium of claim 24, wherein the polygon in the display block is a triangle.

26. The computer-readable medium of claim 24, wherein the computer-readable program segment further comprises instructions for initializing the minimum and maximum depth values of the layers in the block to a depth value corresponding to a background of the block.

27. The computer-readable medium of claim 24, wherein the layers in the block comprise a first layer and a second layer, each pixel in the block being associated with either the first layer or the second layer, the first layer having depth values ranging from a first minimum depth value to a first maximum depth value, and the second layer having depth values ranging from a second minimum depth value to a second maximum depth value.

28. The computer-readable medium of claim 27, wherein the step of comparing depth values comprises determining whether the polygon is located closer to a viewpoint than a first layer.

29. The computer-readable medium of claim 27, wherein the step of comparing depth values comprises determining whether the polygon is further from the viewpoint than the first layer but closer to the viewpoint than the second layer.

30. The computer-readable medium of claim 27, wherein the step of comparing depth values comprises determining whether the depth value ranges of the polygon intersect with the depth value ranges of the first layer.

31. The computer-readable medium of claim 27, wherein the step of comparing depth values comprises determining whether the depth value ranges of the polygon intersect with the depth value ranges of the second layer.

32. The computer-readable medium of claim 24, wherein the computer-readable program segment further comprises instructions for updating bits of the bitmask value, the bits corresponding to the pixels in the block making up the polygon.

33. The computer-readable medium of claim 24, wherein the computer-readable program segment further comprises instructions for updating the minimum and maximum depth values of a layer in the block.

34. In a computer graphics display system comprising a display monitor, a method of detecting hidden surfaces of a polygon in a display block, the polygon having depth values corresponding to a minimum depth value and a maximum depth value, the method comprising:
partitioning a screen of the display monitor into a plurality of display blocks having one or more layers of pixels;
storing in a z-range buffer minimum and maximum depth values for the layers in the block, the z-range buffer further storing a bitmask value, each bit in the bitmask value associating a pixel in the block to a layer in the block;
comparing a depth value of the polygon with a depth value of a particular layer in the block stored in the z-range buffer; and
identifying visible pixels in the block making up the polygon based on the comparison;
the layers in the block comprise a first layer and a second layer, each pixel in the block being associated with either the first layer or the second layer, the first layer having depth values ranging from a first minimum depth value to a first maximum depth value, and the second layer having depth values ranging from a second minimum depth value to a second maximum depth value.

* * * * *